(12) United States Patent
Roy et al.

(10) Patent No.: US 7,941,575 B2
(45) Date of Patent: May 10, 2011

(54) PAUSE REQUEST PROCESSING FOR DATA TRAFFIC MODIFICATION

(75) Inventors: Andrew Roy, Erie, CO (US); Amit Bakshi, Sunnyvale, CA (US); Shlomi Krepner, Sunnyvale, CA (US); Eugene Fouxman, Mountain View, CA (US); Dmitry Karpov, San Jose, CA (US); Douglas Lee, Milpitas, CA (US)

(73) Assignee: LeCroy Corporation, Chestnut Ridge, NY (US)

( * ) Notice: Subject to any disclaimer, the term of this patent is extended or adjusted under 35 U.S.C. 154(b) by 653 days.

(21) Appl. No.: 11/681,537

(22) Filed: Mar. 2, 2007

(65) Prior Publication Data

US 2007/0206496 A1 Sep. 6, 2007

Related U.S. Application Data

(60) Provisional application No. 60/779,180, filed on Mar. 3, 2006, provisional application No. 60/779,039, filed on Mar. 3, 2006, provisional application No. 60/779,179, filed on Mar. 3, 2006, provisional application No. 60/778,834, filed on Mar. 3, 2006, provisional application No. 60/779,084, filed on Mar. 3, 2006, provisional application No. 60/779,085, filed on Mar. 3, 2006, provisional application No. 60/779,264, filed on Mar. 3, 2006, provisional application No. 60/892,093, filed on Feb. 28, 2007.

(51) Int. Cl.
*G06F 13/38* (2006.01)
(52) U.S. Cl. .................. 710/29; 710/33; 710/54; 710/72
(58) Field of Classification Search .......................... None
See application file for complete search history.

(56) References Cited

U.S. PATENT DOCUMENTS

| 7,523,235 B2 * | 4/2009 | Nemazie et al. ................. 710/74 |
| 2006/0267798 A1 | 11/2006 | Jacobsen et al. ................. 41/931 |
| 2007/0005838 A1 * | 1/2007 | Chang et al. ..................... 710/62 |
| 2007/0189176 A1 * | 8/2007 | Milne et al. ..................... 370/241 |
| 2007/0220357 A1 * | 9/2007 | Vedanabhatla et al. ......... 714/43 |

OTHER PUBLICATIONS

"SAS Infusion Error Injection Platform for Serial Attached SCSI and Serial ATA," LeCroy Protocol Solutions Group, Believed to have been publicly available as of Dec. 21, 2004, 2 pages.
"SAS Infusion User Manual, Error Injection Platform for Serial Attached SCSI and Serial ATA," User Manual Version 1.21 for Software Version 1.2, LeCroy Protocol Solutions Group, Feb. 2007, 113 pages.

(Continued)

*Primary Examiner* — Cheng-Yuan Tseng
(74) *Attorney, Agent, or Firm* — Gordon Kessler

(57) ABSTRACT

Apparatus and associated systems and methods may relate to a data traffic modification system that may include a processing module to handle SATA-compliant data transfers in which a source device or a target device issues requests to pause and subsequently to resume the data transfer. In various implementations, a data traffic modification device may selectively modify data traffic upon the occurrence of a predetermined condition. In one illustrative example, if a target device for the data transfer issues a pause request (e.g., to prevent a buffer overflow), the data traffic modification device may generate a pause acknowledge signal to the target device within a response time specified by the protocol. In another illustrative example, if a source device for the data transfer issues a pause request, the data traffic modification device may generate a pause acknowledge signal to the source device within the response time specified by the protocol.

28 Claims, 10 Drawing Sheets

OTHER PUBLICATIONS

"SAS Infusion, SATA Infusion, FAQ," LeCroy Protocol Solutions Group, 2006, 3 pages.

"SAS Infusion and SATA Infusion Error Injector and Traffic Modifier," LeCroy Protocol Solutions Group, Believed to have been publicly available as of Mar. 29, 2005, 6 pages.

"Infusion 1.20—Release Notes," Updated Aug. 21, 2006, LeCroy Protocol Solutions Group, Aug. 21, 2006, 5 pages.

"Product Bulletin (#IF-001) SAS/SATA Infusion Announcement," LeCroy Protocol Solutions Group, Feb. 28, 2005, 2 pages.

"LeCroy Introduces Error Injection System For Serial Attached SCSI And Serial ATA," LeCroy Press Release, Mar. 1, 2005, 2 pages.

"Finisar Adds SAS and SATA Protocols to Its Industry-Leading Xgig(R) Analyzer 3.0," http://investor.finisar.com/ReleaseDetail.cfm?pf=yes&ReleaseID=186233, printed Feb. 7, 2007, Feb. 1, 2006, 2 pages.

"Finisar Announces Next Generation Analysis Solutions for Storage Area Networks (SANs)," http://investor.finisar.com/ReleaseDetail.cfm?pf=yes&ReleaseID=146677, printed Feb. 7, 2007, Oct. 27, 2004, 2 pages.

"Finisar Announces First Protocol Analyzer for Consumer Electronics Storage Interface," http://investor.finisar.com/releasedetail.cfm?ReleaseID=184656, Jan. 18, 2006, 3 pages.

* cited by examiner

|   | Sent by Initiator | Sent by Infusion Initiator Port | | Sent by Infusion Target Port | Sent by Target |
|---|---|---|---|---|---|
| 1 | Data A |  |  |  | R_IP |
| 2 | Data B |  |  |  | R_IP |
| 3 | Data C | R_IP |  | Data A | CONT |
| 4 | Data D | R_IP |  | Data B | XXX(R_IP) |
| 5 | Data E | CONT |  | Data C | XXX(R_IP) |
| 6 | Data F | XXX(R_IP) |  | Data D | XXX(R_IP) |
| 7 | Data G | XXX(R_IP) |  | Data E | HOLD |
| 8 | Data H | XXX(R_IP) |  | Data F | HOLD |
| 9 | Data I | HOLD |  | Data G | CONT |
| 10 | Data J | HOLD |  | Data H | XXX(HOLD) |
| 11 | Data K | CONT |  | HOLDA | XXX(HOLD) |
| 12 | Data L | XXX(HOLD) |  | HOLDA | XXX(HOLD) |
| 13 | HOLDA | XXX(HOLD) |  | HOLDA | XXX(HOLD) |
| 14 | HOLDA | XXX(HOLD) |  | HOLDA | XXX(HOLD) |
| 15 | CONT | XXX(HOLD) |  | HOLDA | XXX(HOLD) |
| 16 | XXX(HOLDA) | XXX(HOLD) |  | HOLDA | XXX(HOLD) |
| 17 | XXX(HOLDA) | XXX(HOLD) |  | HOLDA | XXX(HOLD) |
| 18 | XXX(HOLDA) | XXX(HOLD) |  | HOLDA | XXX(HOLD) |
| 19 | XXX(HOLDA) | XXX(HOLD) |  | HOLDA | R_IP |
| 20 | XXX(HOLDA) | XXX(HOLD) |  | HOLDA | R_IP |
| 21 | XXX(HOLDA) | R_IP |  | HOLDA | CONT |
| 22 | XXX(HOLDA) | R_IP |  | HOLDA | XXX(R_IP) |
| 23 | XXX(HOLDA) | CONT |  | Data I | XXX(R_IP) |
| 24 | XXX(HOLDA) | XXX(R_IP) |  | Data J | XXX(R_IP) |
| 25 | HOLDA | XXX(R_IP) |  | Data K | XXX(R_IP) |
| 26 | Data M | XXX(R_IP) |  | Data L | XXX(R_IP) |
| 27 | Data N | XXX(R_IP) |  | ALIGN(0) | XXX(R_IP) |
| 28 | Data O | XXX(R_IP) |  | ALIGN(0) | XXX(R_IP) |
| 29 |  |  |  | Data M |  |

FIG. 5

|   | Sent by Initiator | Sent by Infusion Initiator Port | | Sent by Infusion Target Port | Sent by Target |
|---|---|---|---|---|---|
| 1 | Data A | | | | R_IP |
| 2 | Data B | | | | R_IP |
| 3 | Data C | R_IP | | Data A | CONT |
| 4 | HOLD | R_IP | | Data B | XXX(R_IP) |
| 5 | HOLD | CONT | | Data C | XXX(R_IP) |
| 6 | CONT | XXX(R_IP) | | HOLD | XXX(R_IP) |
| 7 | XXX(HOLD) | XXX(R_IP) | | HOLD | XXX(R_IP) |
| 8 | XXX(HOLD) | HOLDA | | CONT | XXX(R_IP) |
| 9 | XXX(HOLD) | HOLDA | | XXX(HOLD) | XXX(R_IP) |
| 10 | XXX(HOLD) | HOLDA | | XXX(HOLD) | HOLDA |
| 11 | XXX(HOLD) | HOLDA | | XXX(HOLD) | HOLDA |
| 12 | HOLD | HOLDA | | XXX(HOLD) | CONT |
| 13 | Data D | HOLDA | | XXX(HOLD) | XXX(HOLDA) |
| 14 | Data E | HOLDA | | HOLD | XXX(HOLDA) |
| 15 | Data F | HOLDA | | Data D | XXX(HOLDA) |
| 16 | Data G | HOLDA | | Data E | XXX(HOLDA) |
| 17 | Data H | R_IP | | Data F | XXX(HOLDA) |
| 18 | Data I | R_IP | | Data G | XXX(HOLDA) |
| 19 | Data J | CONT | | Data H | R_IP |
| 20 | Data K | XXX(R_IP) | | Data I | R_IP |
| 21 | Data L | XXX(R_IP) | | Data J | CONT |

FIG. 6

| 900 | AAAA | BBBB | CCCC | DDDD | EEEE | FFFF | GGGG | HHHH | IIII | JJJJ |
|---|---|---|---|---|---|---|---|---|---|---|
| Byte # | 0 | 1 | 2 | 3 | 4 | 5 | 6 | 7 | 8 | 9 |

➤ at byte 4

FIG. 9a

| 900 | AAAA | BBBB | CCCC | DDDD | EEEE | FFFF | GGGG | EEEE | IIII | JJJJ |
|---|---|---|---|---|---|---|---|---|---|---|
| Byte # | 0 | 1 | 2 | 3 | 4 | 5 | 6 | 7 | 8 | 9 |

➤ at byte 4, ⇨ at byte 7

FIG. 9b

| 900 | AAAA | EEEE | CCCC | DDDD | EEEE | FFFF | GGGG | HHHH | IIII | JJJJ |
|---|---|---|---|---|---|---|---|---|---|---|
| Byte # | 0 | 1 | 2 | 3 | 4 | 5 | 6 | 7 | 8 | 9 |

⇨ at byte 1, ➤ at byte 4

FIG. 9c

PAUSE REQUEST PROCESSING FOR DATA TRAFFIC MODIFICATION

CROSS-REFERENCE TO RELATED APPLICATIONS

This application claims priority to: U.S. Patent Application Ser. No. 60/779,039, entitled "Data Capture Method And Apparatus," which was filed by Roy, A., et al. on Mar. 3, 2006; U.S. Patent Application Ser. No. 60/779,179, entitled "Protocol Traffic Modification Method And Apparatus," which was filed by Fouxman, E., et al. on Mar. 3, 2006; U.S. Patent Application Ser. No. 60/778,834, entitled "Cross Platform Trigger Method And Apparatus," which was filed by Roy, A., et al. on Mar. 3, 2006; U.S. Patent Application Ser. No. 60/779,084, entitled "Scenario View Method And Apparatus," which was filed by Lee, D., et al. on Mar. 3, 2006; U.S. Patent Application Ser. No. 60/779,180, entitled "Processing Of Hold Command In Protocol Analyzer," which was filed by Roy, A., et al. on Mar. 3, 2006; U.S. Patent Application Ser. No. 60/779,085, entitled "Communication Flow Recovery Method and Apparatus," which was filed by Karpov, D. on Mar. 3, 2006; and, U.S. provisional patent application 60/779,264 entitled, "Impairment and Monitoring Apparatus and Method," by Roy, A., et al., which was filed Mar. 3, 2006. This application also claims priority to U.S. Patent Application Ser. No. 60/892,093, entitled "Data Traffic Modifier Method and Apparatus," which was filed by Roy, A., et al. on Feb. 28, 2007. The disclosures of each of these priority documents are incorporated herein by reference.

TECHNICAL FIELD

Various embodiments relate to apparatus for modifying data traffic signals.

BACKGROUND

Data rates continue to increase in digital systems, communication systems, computer systems, and in other applications. In such applications, various devices communicate data using signals that may be encoded with information in the form of signal levels (e.g., amplitude) in certain intervals of time. Proper decoding of signals, for example, may involve measuring small signal levels in the correct time intervals. As data rates increase, margins of error for the signal level timing tend to decrease.

Likewise, operating frequencies for some analog signal processing systems continue to increase along with advances in telecommunication technologies, for example.

Various test and measurement equipment may be used to verify signal integrity in analog and digital systems. For example, oscilloscopes may be used to measure analog waveforms, and protocol analyzers may be used to monitor data in digitally formatted signals. Other waveform processing equipment may provide signal processing operations that may include, but are not limited to, acquisition (e.g., sampling, monitoring) and/or modification (e.g., filtering, time-shifting, amplification) of analog and/or digital signal waveforms.

In a typical data transfer, a data source device may transmit data to be received by a target device. Data transfers may be performed according to electrical and timing parameters specified by a communication protocol. Representative examples of well-known serial communication protocols include Fibre Channel, SATA (Serial Advanced Technology Attachment), SAS (serial attached SCSI (small computer system interface)), and SATA Tunneling Protocol (STP). Communication errors can occur when data transfers do not meet the protocol specifications.

SUMMARY

Apparatus and associated systems and methods may relate to a data traffic modification system that may include a processing module to handle SATA-compliant data transfers in which a source device or a target device issues requests to pause and subsequently to resume the data transfer. In various implementations, a data traffic modification device may selectively modify data traffic upon the occurrence of a predetermined condition. In one illustrative example, if a target device for the data transfer issues a pause request (e.g., to prevent a buffer overflow), the data traffic modification device may generate a pause acknowledge signal to the target device within a response time specified by the protocol. In another illustrative example, if a source device for the data transfer issues a pause request, the data traffic modification device may generate a pause acknowledge signal to the source device within the response time specified by the protocol.

Certain embodiments may provide one or more advantages. For example, a data traffic modification system may smoothly and robustly handle high speed data transfers between a wide variety of source and target devices. In various implementations, the data traffic modification device may overcome the delay associated with buffering the data transfer by monitoring bidirectional data traffic for pause requests, and responding rapidly by generating expected acknowledge signals within the response time expected by the device that issued the pause request. In some particular embodiments, a device capable of in-line data traffic modification device may respond to pause request signals within a response time (e.g., 20 double words) as specified by various protocols (e.g., SAS, STP, SATA, SATA 2.0, and the like). In one example, before resuming a data transfer after being paused by, for example, a source device, a data traffic modification device may advantageously restore a context in effect when the data transfer was paused. In another example, after generating an acknowledge signal in response to a pause request from a target device, the data traffic modification device may advantageously buffer data from the source device until the pause request propagates to the source device, and the source device pauses the data transfer in response to the pause request.

The details of one or more embodiments are set forth in the accompanying drawings and the description below. Other features, objects, and advantages will be apparent from the description and drawings, and from the claims.

DESCRIPTION OF DRAWINGS

FIG. 5 is a table that illustrates an exemplary communication session among a SATA initiator, a data traffic modification device, and a SATA target, when the SATA target requests a hold.

FIG. 6 is a table that that illustrates an exemplary communication session among a SATA initiator, a data traffic modification device, and a SATA target, when the SATA initiator requests a hold.

FIGS. 9a-c illustrate two exemplary data substitution processes being performed upon the data stream.

DETAILED DESCRIPTION

Figure 1:
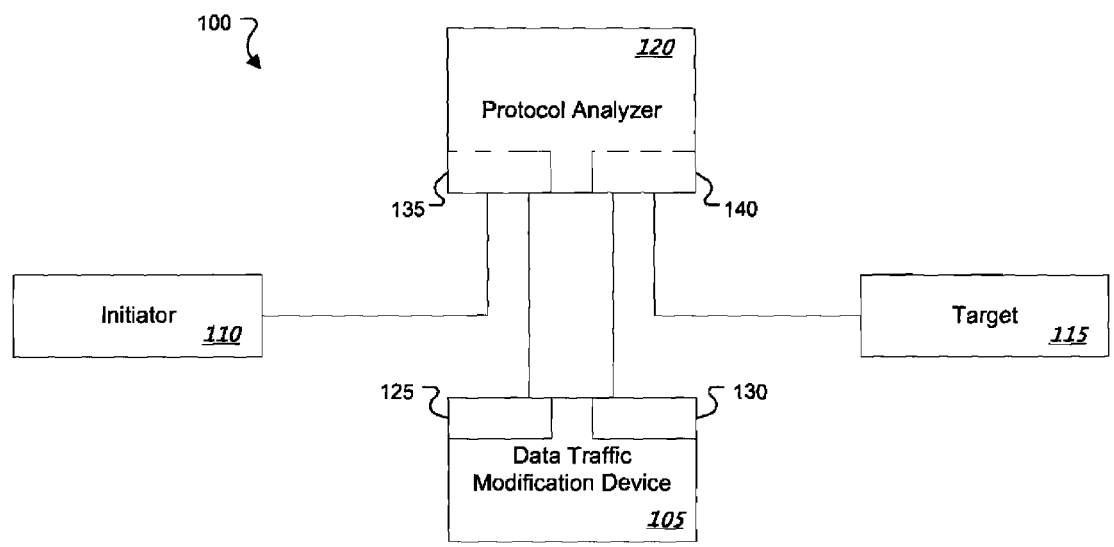
FIG. 1 illustrates a block diagram of an exemplary configuration capable of modifying data traffic.

FIG. 1 illustrates a block diagram 100 of an exemplary configuration for using a data traffic modification device 105. The data traffic modification device 105 may be used to selectively modify some or all data traffic flowing between a SATA (Serial Advanced Technology Attachment) initiator 110, such as a computer with a SATA interface, and a SATA target 115, such as a hard disk drive or drive array. In some embodiments, the selective modification of data may be performed on data traffic in one or more directions. In some embodiments, the data may be modified to purposely alter the communications between the SATA initiator 110 and the SATA target 115.

In the depicted example, the configuration 100 includes the data traffic modification device 105, the initiator 110, the target 115, and a protocol analyzer 120. The data traffic modification device includes a first port 125 and a second port 130. In this example, the ports 125, 130 are compliant with the SATA standard, and include two pairs of conductors in order to allow for bidirectional communications. The first port 125 is in communication with a first channel 135 of the protocol analyzer 120, and the second port 130 is in communication with a second channel 140 of the protocol analyzer 120. The first port 135 is also in communication with the initiator 10, and the second port 140 is also in communication with the target 115.

In the configuration 100, communications between the SATA initiator 110 and the SATA target 115 may be modified by the data traffic modification device 105 and traced by the protocol analyzer 120. This configuration may allow a technician to confirm that the data traffic modification device 105 has been configured correctly, or may allow a technician to observe how the SATA initiator 110 or SATA target 115 respond when either receives modified data.

While the exemplary configuration 100 has been described in terms of communications according to a version of SATA standard, various embodiments may use various versions of the SATA protocol (e.g., SATA 2.0), and/or protocols other than SATA. In some examples, the configuration 100 may use a SATA-compliant protocol such as SAS (serial attached SCSI (small computer system interface)) and/or SATA Tunneling Protocol (STP). In some embodiments, the data traffic modification device 105 may also be capable of using a combination of protocols. For example, the configuration 100 may be implemented with the SAS initiator 10 using SAS and the target 115 using SAS, STP, or SATA. In some further examples, a hub may be included to provide connections between at least one initiator 110 and at least one target 15, where each connection may use a combination of protocols. Further aspects and examples relating to data traffic modification are described in U.S. provisional patent application 60/779,264 entitled, "Impairment and Monitoring Apparatus and Method," by Roy, A., et al., which was filed Mar. 3, 2006, and the contents of which are incorporated herein by reference.

Figure 2:
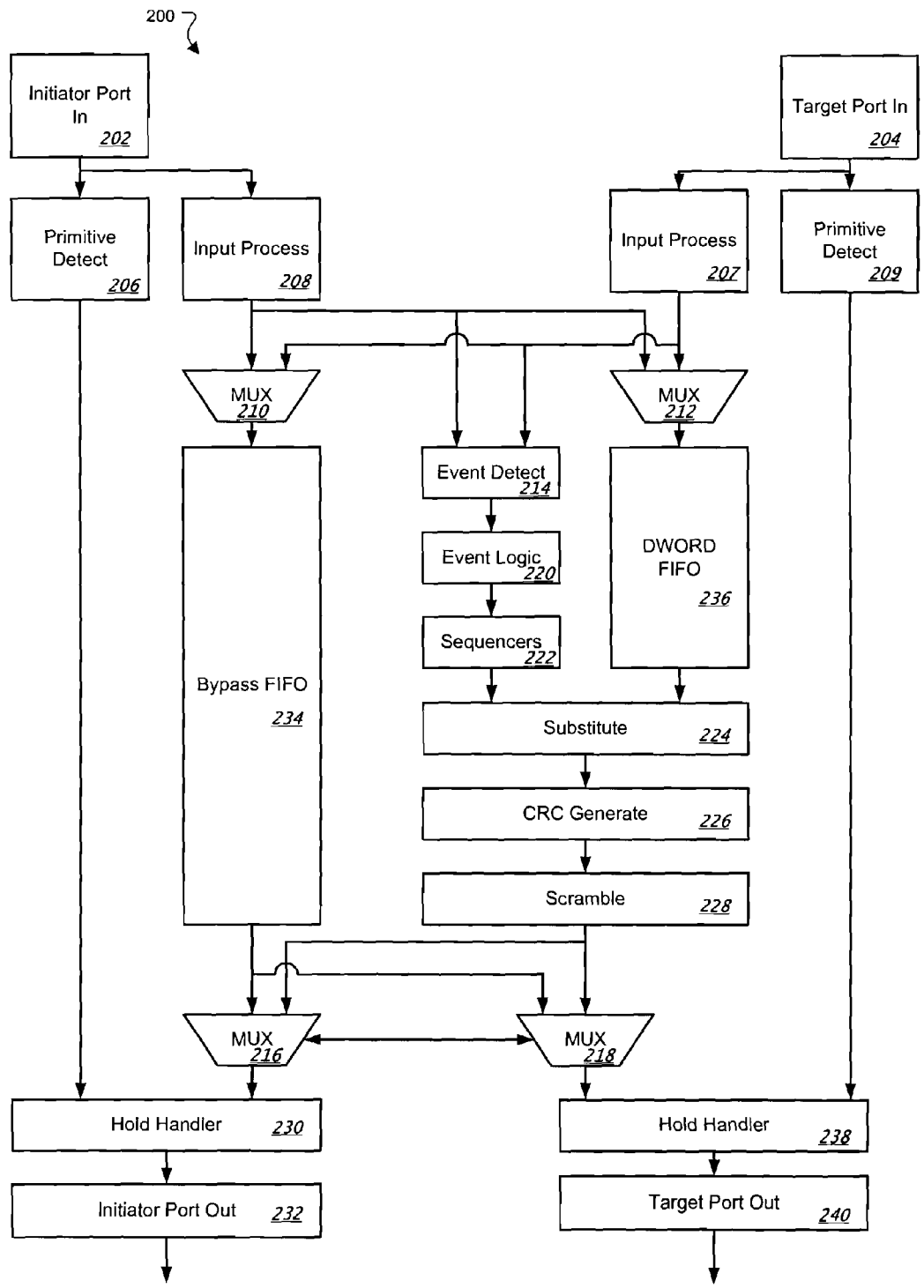
FIG. 2 is a block diagram of an exemplary data traffic modification device.

FIG. 2 is a block diagram 200 depicting an exemplary data flow through the data traffic modification device 105 of FIG. 1. Communications data may enter the data traffic modification device 105 through an initiator port in 202, or through a target port in 204. Data entering though the initiator port in 202 then passes to a first primitive detect module 206 and a first input processing module 208. In some embodiments, the primitive detect module 206 may be configured to react to (or "snoop for") selected SATA primitives such as "HOLD." Data entering the block diagram 200 through the target port in 204 passes through a second input processing module 207 and a second primitive detect module 209.

Data passing through the input processing module 208 is then passed to a first multiplexer 210, a second multiplexer 212, and an event detection module 214. The first multiplexer 210 and second multiplexer 212 (as well as a third multiplexer 216 and a fourth multiplexer 218) are present to control the paths through which each direction of data traffic should propagate through the block diagram 200. In the depicted example, both directions of data traffic are monitored, but only one direction of data traffic can be selectively modified at any one time. The direction of data traffic to be selectively modified is routed by the multiplexers to a dword FIFO 236, while the opposite direction of data traffic is routed through a bypass FIFO 234.

In some other embodiments, more than one direction, lane or channel of data traffic may be modified at any one time. For example, multiplexers may be removed and/or additional hardware and corresponding software, examples of which are described below with reference to FIG. 2, may be added to permit selective modification of data traffic in both directions of a bidirectional communication link, for example.

In FIG. 2, data passing through the second multiplexer 212 flows through the dword buffer 236. In some embodiments, the dword buffer 236 may be monitored by an event detect module 214, an event logic module 220, and/or a sequencer module 22', which couples to a substitution module 224.

Data from either or both of the input process modules 207, 208 may be received as inputs to the event detection module 214, which may be configured (e.g., programmed) to identify selected primitives, out-of-band (OOB) messages, and the like. The event detection module 214 may be configured, for example, to identify user-Specified input conditions, the occurrence of which may cause a processor to perform operations to selectively modify the data stream, for example. Signals from the event detection module 214 are received by the event logic module 220, which can be programmed by the user to provide a specified response to certain specified trigger conditions (e.g., primitives and data patterns detected in the event logic module 220). These responses may include actions that selectively modify data in the data stream, drop data, sound an audible beep, stimulate a trigger port, or perform a combination of these or other actions.

From the event logic module 220, control passes to a sequencer module 222. The sequencer module 222 may be implemented as a user-programmable state machine. The sequencer module 222 state machine may be configured to cooperate with the event logic module 220 to modify (e.g., add to, ignore, remove, and/or replace some or all of the bits in a frame of data) the data stream. The data is then sent to a substitution module 224. The substitution module 224 may cooperate with the sequencer module 222 to selectively modify one or more bits within a data frame, for example, based on operation of the state machine. Such substitutions may be performed, for example, in order to inject an error to test the response of the initiator 110 and/or the target 115.

In some implementations, the data traffic may have data frames that include CRC (cyclical redundancy check) data, which may be used to verify the integrity of the data that is received. When the substitution module 224 modifies data in the data frame, the CRC for that frame may be incorrect for the modified data frame. A CRC generation module 226 may, for example, recalculate valid CRC data for the frame, and substitute this recalculated CRC data for the original CRC data in the data frame. Examples of processes for data substitution in a data traffic modification device are described in further detail in U.S. provisional patent application 60/779,039 entitled, "Data Capture Method and Apparatus," by Roy, A., et al., which was filed Mar. 3, 2006, and the contents of which are incorporated herein by reference. Control then passes to a scrambler module 228. The scrambler module 228 may reduce the transmission of long repetitive data patterns that could contribute to electromagnetic interference.

Data leaving the scrambler module 228 is then passed to the third multiplexer 216 and the fourth multiplexer 218. Data passed to the third multiplexer 216 may pass the data to the fourth multiplexer 218, or vice versa, or the data may be passed to a first hold handler 230 or a second hold handler 238. Data passed to the first hold handler 230 is sent to the initiator via an initiator port out 232. Data passed to the second hold handler 238 is sent to the target via a target port out 240.

In operation, the exemplary block diagram 200 illustrates a data traffic modification device configured to substantially reduce the propagation times that add delay to the acknowledgment of a pause request from either an initiator or a target device. Data propagating through the data modification path (modules 214, 220-228, 236) may experience a delay caused by the previously described processing steps. Some communication protocols, such as the SATA specification, for example, specify that a transmitting device must, within a specified response time such as 20 dwords (double words, or 32-bit values), acknowledge a pause request signal by suspending the transmission of valid data and by sending a hold acknowledgement signal to acknowledge the pause request. The pause request may be to prompt the initiator to suspend the data transfer to avoid, for example, a buffer overflow, which may result in a loss of data or other problems. The data paths for propagating the pause request through the data traffic modification device (e.g., from the target port in 204 to the initiator port out 232) include a buffer or memory. In the depicted example, and depending on the states of the multiplexers 210, 212, the data path through which a pause request would propagate includes either the bypass FIFO 234 or the dword FIFO 236. The FIFOs 234, 236 may be, for example, buffers FIFO (first in-first out), FILO (first in-last out), circular, linear, parallel, or combinations of these or other types of buffers. In some embodiments, the FIFOs 234, 236 may be implemented using pointers to memory locations, one or more data stores, shift registers, or a combination of these or other buffering techniques.

In operation of the example block diagram 200, the data traffic modification device may introduce a delay in the data stream. In some examples, such delay may substantially prevent the device requesting a pause from receiving a pause acknowledgment signal within response time specification for the protocol being used. Various embodiments may be adapted to meet a protocol's response time specification.

In an illustrative example, a target device (e.g., disk drive) may issue a pause request to an initiator (e.g., host or server) that is transferring data to the target device. The target may issue a pause request, for example, if it is receiving data faster that it can process the data. In the depicted figure, the primitive detect module 209 is configured to detect and react to pause requests from the target. In operation, the primitive detect module 209 may react by signaling the hold handler 238 to generate a pause request acknowledge signal back to the target. This process may allow a pause acknowledgement signal to be sent to the target while avoiding the delay associated with propagating through the buffer FIFOs 234, 236. In this example, data being transferred from the initiator may continue to be sent until the initiator receives and responds to the pause request after the pause request propagates through one of the FIFOs 234, 236. During this time, the valid data sent by the initiator may be buffered in one of the FIFOs 234, 236 at least until the target breaks the pause state and the data transfer resumes.

In another illustrative example, an initiator (e.g., host device) may issue a pause request. After the pause request is issued, some time may pass while the pause request propagates though the block diagram 200 (e.g., from the initiator port in 202, to the first input processing module 208, through one of the FIFOs 234, 236, and to the target port out 240). As such, the target may acknowledge the pause request after some delay that, in some examples, may exceed the response time specification for the communication protocol. After the initiator issues the pause request, the first primitive detect module 206 may detect the pause request and pass control to the first hold handler module 230. The first hold handler module 230 then generates a pause acknowledgement message that is sent out the initiator port out 232. When the initiator breaks the pause state, the substitution module 224 may generate signals to restore the context of the data stream that was in effect when the pause request was received. Examples of restoring the context upon resuming the data transfer are described in further detail with reference to FIG. 4.

In some embodiments, such as those that use a version of the SATA protocol, the pause request may include, for example, a SATA HOLD primitive, the acknowledge pause request may include a SATA HOLDA primitive, and the continue primitive may include a SATA CONT primitive. Some protocols may specify certain rules associated with such primitives. For example, some protocols may impose a response specification that a pause request, for example, be acknowledged within a certain time period or that only a limited quantity of data in the data stream be transferred after a pause request is issued. Examples of processing pause primitives in a data traffic modification device are described in further detail in U.S. provisional patent application 60/779,180 entitled, "Processing Of Hold Command In Protocol Analyzer," by Roy, A., et al., which was filed Mar. 3, 2006, and the contents of which are incorporated herein by reference.

In some implementations, the traffic modification device 105 may generate pause request acknowledgement signals to satisfy the response time specified by the applicable protocols. Exemplary implementations for processing pause requests in the configuration 100 are described with reference to FIGS. 4-8.

Figure 3A:
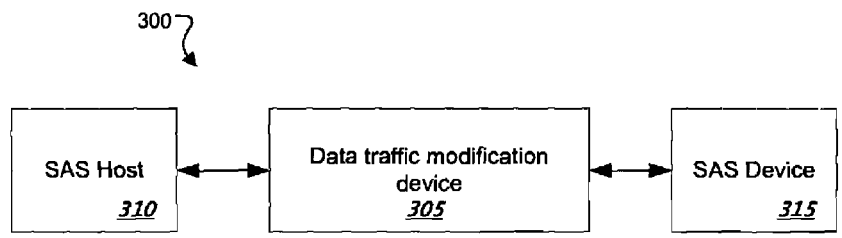
FIGS. 3a-c are block diagrams depicting exemplary configurations for using a data traffic modification device.
Figure 3B:
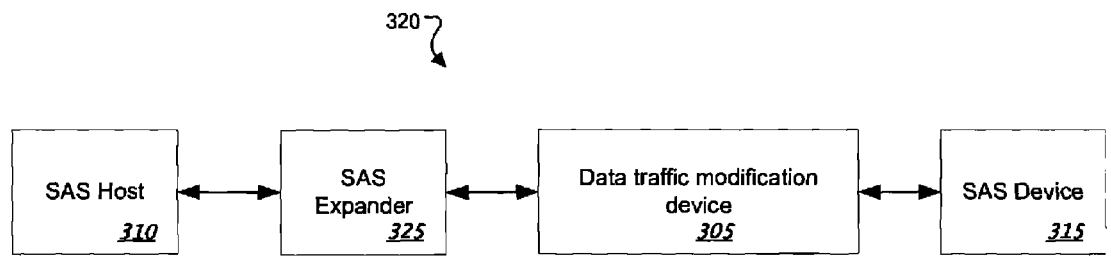
Figure 3C:
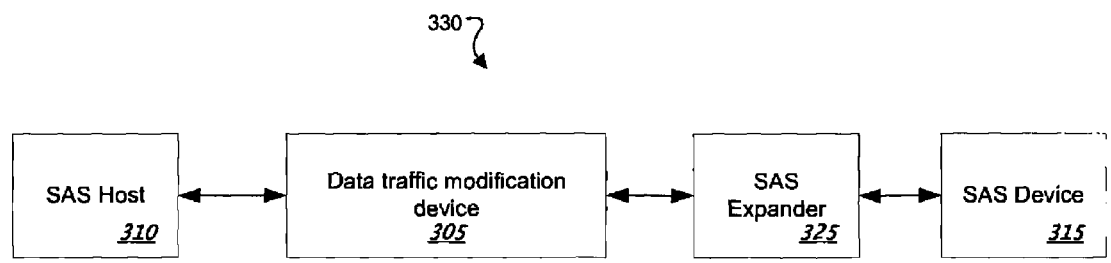

FIGS. 3a-c illustrate exemplary block diagrams depicting various configurations for using a data traffic modification device. FIG. 3a illustrates an exemplary block diagram 300 of an embodiment for the use of a data traffic modification device 305. In this embodiment, the data traffic modification device 305 is placed between a SAS host 310 and a SAS device 315. In some embodiments, the SAS device 315 may be replaced by a SATA device. In some embodiments, the SAS host 310 may be a SATA host if the configuration also includes a SATA device.

FIG. 3b illustrates and exemplary block diagram 320 of another embodiment for the use of the data traffic modification device 305. In this embodiment, the SATA host 310 is connected to a SAS expander 325. The SAS expander 325 is also connected to the data traffic modification device 305, and the data traffic modification device 305 is connected to the SAS device 315.

FIG. 3c illustrates an exemplary block diagram 330 of another implementation of the data traffic modification device 305. In this example, the SAS host 310 is connected to the data traffic modification device 305, the data traffic modification device 305 is connected to the SAS expander 325, and the SAS expander 325 is connected to the SAS device 315.

Figure 4:
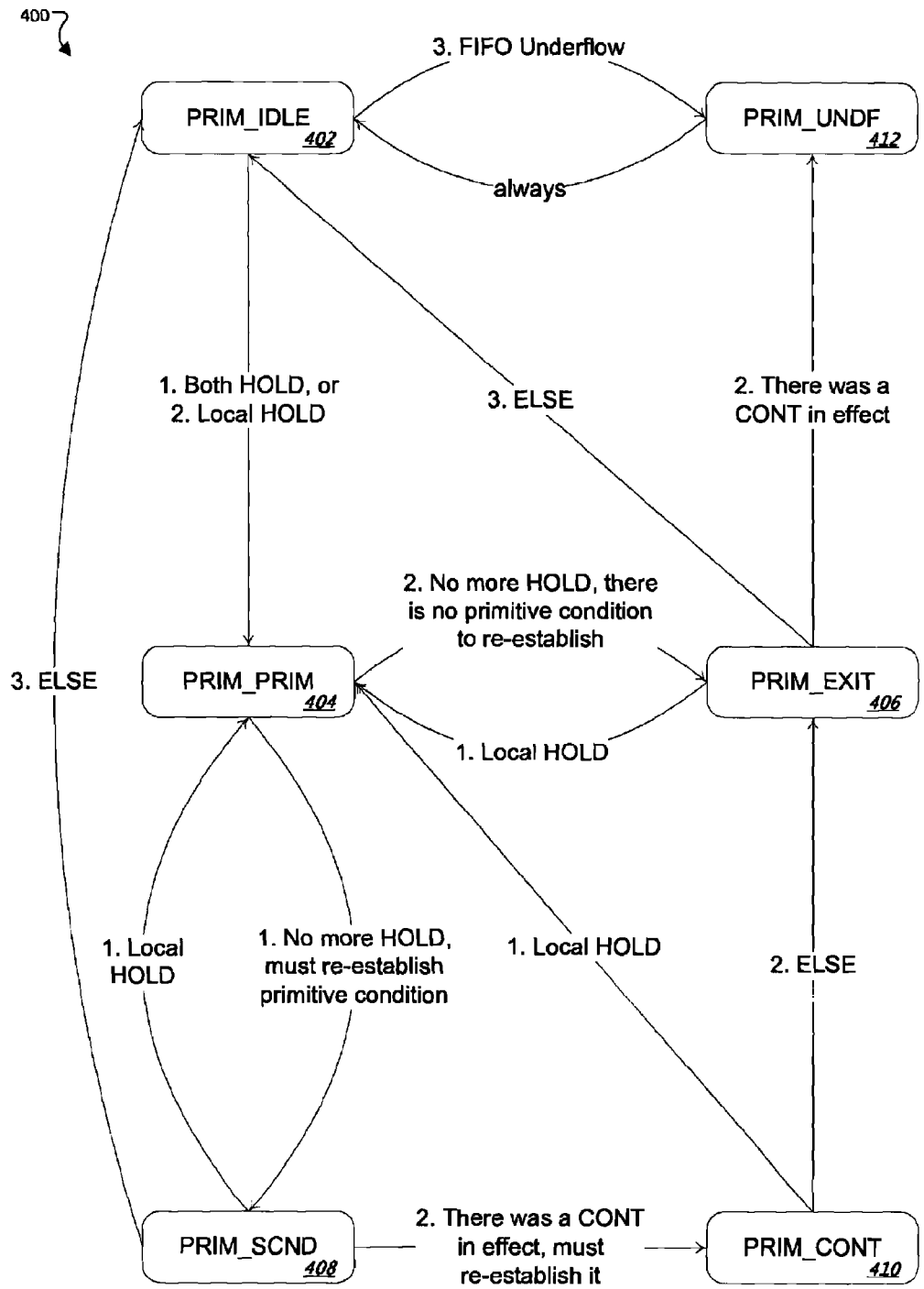
FIG. 4 is a flow diagram of an exemplary state machine for data traffic modification.

FIG. 4 illustrates a flow diagram of an exemplary state machine 400 used in a data traffic modifier. In one example, a SATA host may be sending data to a SATA target when the SATA target sends a pause request (as will be further described with reference to FIG. 5 and FIG. 7). The state machine 400 starts in a PRIM_IDLE state 402. During this state, the data traffic modification device propagates data between the host and the target. In the depicted example, the host is sending data to the target. If the data traffic modification device detects that the target has sent a pause request (e.g., a "HOLD" primitive), the state machine 400 responds by propagating the pause request to the host and transitioning to a PRIM_PRIM state 404. During the PRIM_PRIM state 404, the data traffic modification device generates a series of hold acknowledgements (e.g., a series of "HOLDA" primitives) and sends them to the target, and buffers any data that the host sends until the host acknowledges the pause request. When the target is once again able to receive data, the target may send a receiving message (e.g., a "R_IP" primitive, or a R_IP-R_IP-CONT sequence). When the data traffic modification device senses such a receiving message, and there is no continued state to re-establish, the state machine 400 propagates the receiving message to the host and transitions to a PRIM_EXIT state 406. During the PRIM_EXIT state 406, the data traffic modification device sends any data that may have been buffered. When the buffer has been emptied, the state machine 400 transitions back to the PRIM_IDLE state 402.

In another example, the SATA host may send a pause request after sending one or more primitives. In this case the state machine 400 starts in the PRIM_IDLE state 402. During the PRIM_IDLE state the data traffic modification device may receive a continued primitive message (e.g., a "R_IP-R_IP-CONT" sequence) from the target. The data traffic modification device may also receive a continued pause request from the host (e.g., a "HOLD-HOLD-CONT" sequence). Upon detection of the continued pause request, the state machine 400 propagates the continued pause request to the target, stores the context of the continued primitive message from the target, and then transitions to the PRIM_PRIM state. While in the PRIM_PRIM state, the data traffic modification device generates a series of hold acknowledgement messages and sends them to the host. The host may then send a single pause request to break the continued pause request and to resume propagating the data stream. In some embodiments, the SATA primitives that may be used to break a continued state may include, but are not limited to, HOLD, HOLDA, PMREQP, PMREQS, RERR, R_IP, R_OK, R_RDY, SYNC, WTRM, or XRDY. The state machine 400 responds by propagating the message to the target and transitioning to a PRIM_SCND state 408. During the PRIM_SCND state 408, the data traffic modification device recalls the stored context information and uses that stored context information to reestablish the continued target context that was in place prior to the arrival of the continued pause request from the host. Once the prior target context is reestablished, the state machine 400 transitions back to the PRIM_IDLE state 402.

Figure 8:
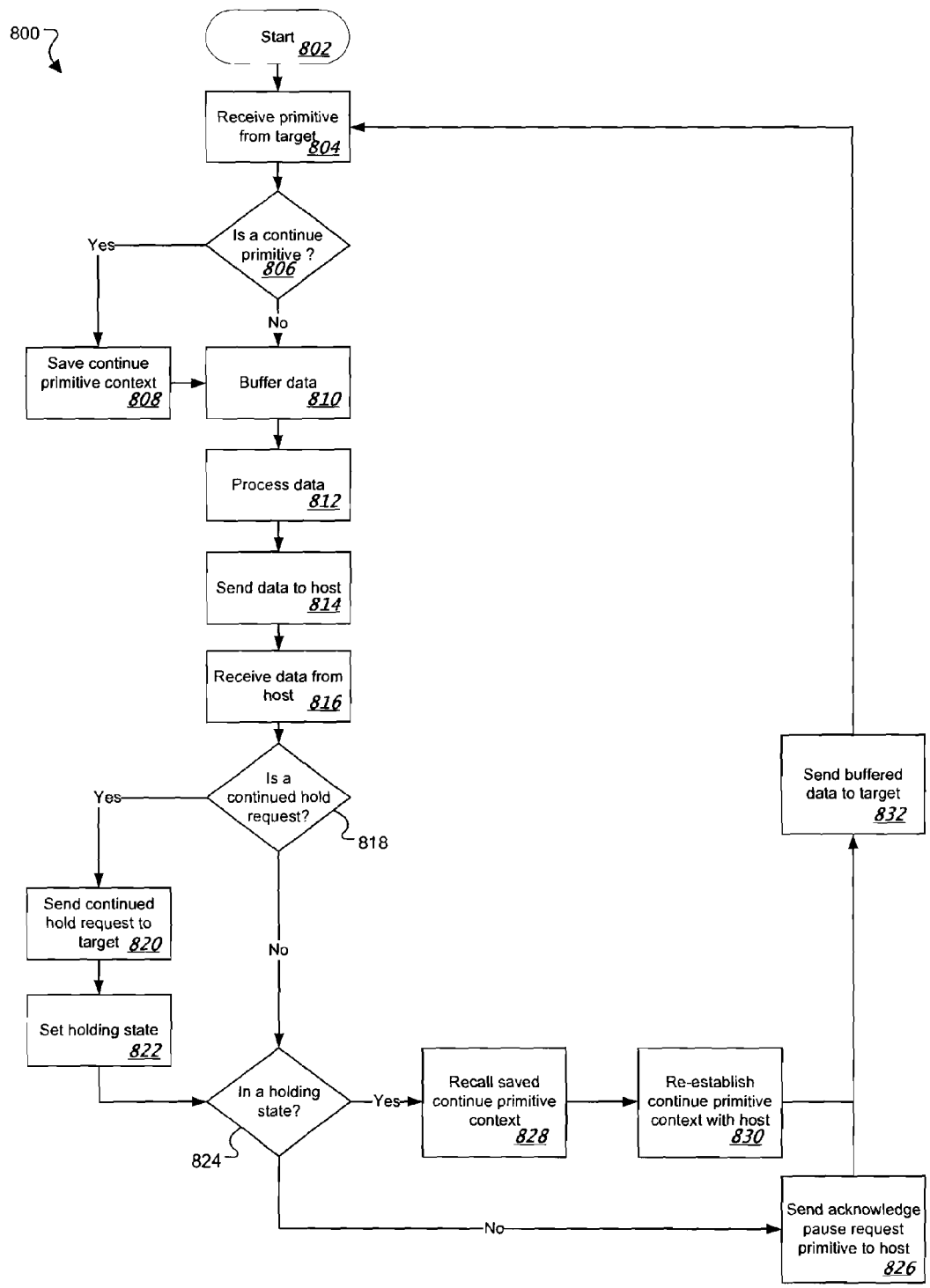
FIG. 8 is a block diagram depicting an exemplary process for handling a context using in a data traffic modification device.

In another example, the SATA host may send a pause request after sending data to the target (as will be further illustrated by FIG. 6 and FIG. 8). In this case, the state machine 400 starts in the PRIM_IDLE state 402 where the data traffic modification device propagates data between the host and target. During this state, the target sends a continued receiving message (e.g., a "R_IP-R_IP-CONT" sequence) and the host sends data. If the data traffic modification device detects that the host has sent a continued pause request, the data traffic modification device propagates that continued pause request to the target, stores the current context information, and transitions to the PRIM_PRIM state 404. During the PRIM_PRIM state 404, the data traffic modification device generates and sends a series of hold acknowledgement messages to the host. If the data traffic modification device then detects that the host has sent a command primitive to break the continued pause request, the state machine 400 propagates the primitive to the target, and transitions to the PRIM_SCND state 408. During the PRIM_SCND state, the data traffic modification device recalls the previously stored target context information, and uses that information to reestablish the previous context. Since the previous context was a continued command, the state machine 400 transitions to a PRIM_CONT state 410. During the PRIM_CONT state 410, the data traffic modification device sends a continuation request to the target to reestablish the "continued" characteristic of the previous target context. The state machine 400 then transitions to the PRIM_EXIT state 406 to send any buffered data that may be in the data traffic modification device, and then returns to the PRIM_IDLE state 402.

In some embodiments, the series of hold acknowledgement statements sent during the PRIM_PRIM state may be replaced by a continued hold acknowledgement message sequence, followed by a series of scrambled "keep alive" messages (e.g., a HOLDA-HOLDA-CONT-XXX(HOLDA)-XXX(HOLDA) . . . sequence).

FIG. 5 illustrates a table 500 that that depicts an exemplary communications session among a SATA initiator (shown in column 510), a data traffic modification device, a data traffic modification device's initiator port (shown in a column 520), a data traffic modification device's target port (shown in a column 530), and a SATA target (shown in a column 540). It should be noted that this table does not represent any particular time scale, and is intended to be only a general depiction of one possible flow of communications. In this example, the initiator is sending data in cycles 1-3. It can also be seen that the target is sending a R_IP-R_IP-CONT sequence in cycles 1-3 to indicate that the target is receiving data. At cycles 3-5, it can be seen that the R_IP sequence sent by the target has been relayed to the initiator port after some delay. Likewise, at cycle 7 the target sends a pause request as part of a HOLD-HOLD-CONT sequence, and after a similar delay the HOLD-HOLD-CONT sequence is relayed at the initiator port. Due to the normal delay required for the initiator to respond to a pause request, in addition to the delay introduced by the data traffic modification device, the initiator does not respond to the pause request until cycle 13, when it sends a hold acknowledgement primitive. In some instances, this delayed response may cause a buffer overrun if all the data packets were sent directly to the target. In order to prevent a possible buffer overrun, the data traffic modification device generates a series of hold acknowledgement primitives (starting at cycle 11 as depicted by the shaded cells) and transmits them to the target. During cycles 9-12 the initiator continues to send data primitives. The traffic modification device buffers these primitives until the target device breaks the continued HOLD at cycles 19-21. At cycles 21-23 the traffic modification device breaks the continued HOLD it has established with the initiator, and at cycle 23 the data traffic modification device begins to empty its FIFO by transmitting buffered data to the target. At cycle 27, the FIFO has been emptied and the data traffic modification device sends a pair of ALIGN(0) primitives, for example, to keep the data line active until the "Data M" primitive sent by the initiator in cycle 26 can be sent to the target in cycle 29.

FIG. 6 illustrates a table 600 that depicts an exemplary communications session among a SATA initiator (shown in a column 610), a data traffic modification device's initiator port (shown in a column 620), a data traffic modification device's target port (shown in a column 630), and a SATA target (shown in a column 640). It should be noted that this table does not represent any particular time scale, and is intended to be only a general depiction of one possible flow of communications. In this example, the initiator is sending data during cycles 1-3, and then sends a HOLD-HOLD-CONT sequence during cycles 4-6. The data traffic modification device responds by storing the current context that it is in (a continued R_IP), relaying the HOLD sequence to the target device during cycles 6-8 and by generating a series of HOLDA frames (depicted by shaded cells) as an acknowledgement to the initiator starting at cycle 8. At cycle 12, the initiator breaks the continued HOLD by sending a single HOLD primitive, after which the initiator resumes transmission of data frames during cycle 13. The data traffic modification device responds by reestablishing the previously saved context by recalling that it was in a continued R_IP state and transmitting a R_IP-R_IP-CONT sequence to the initiator during cycles 17-19.

Figure 7:
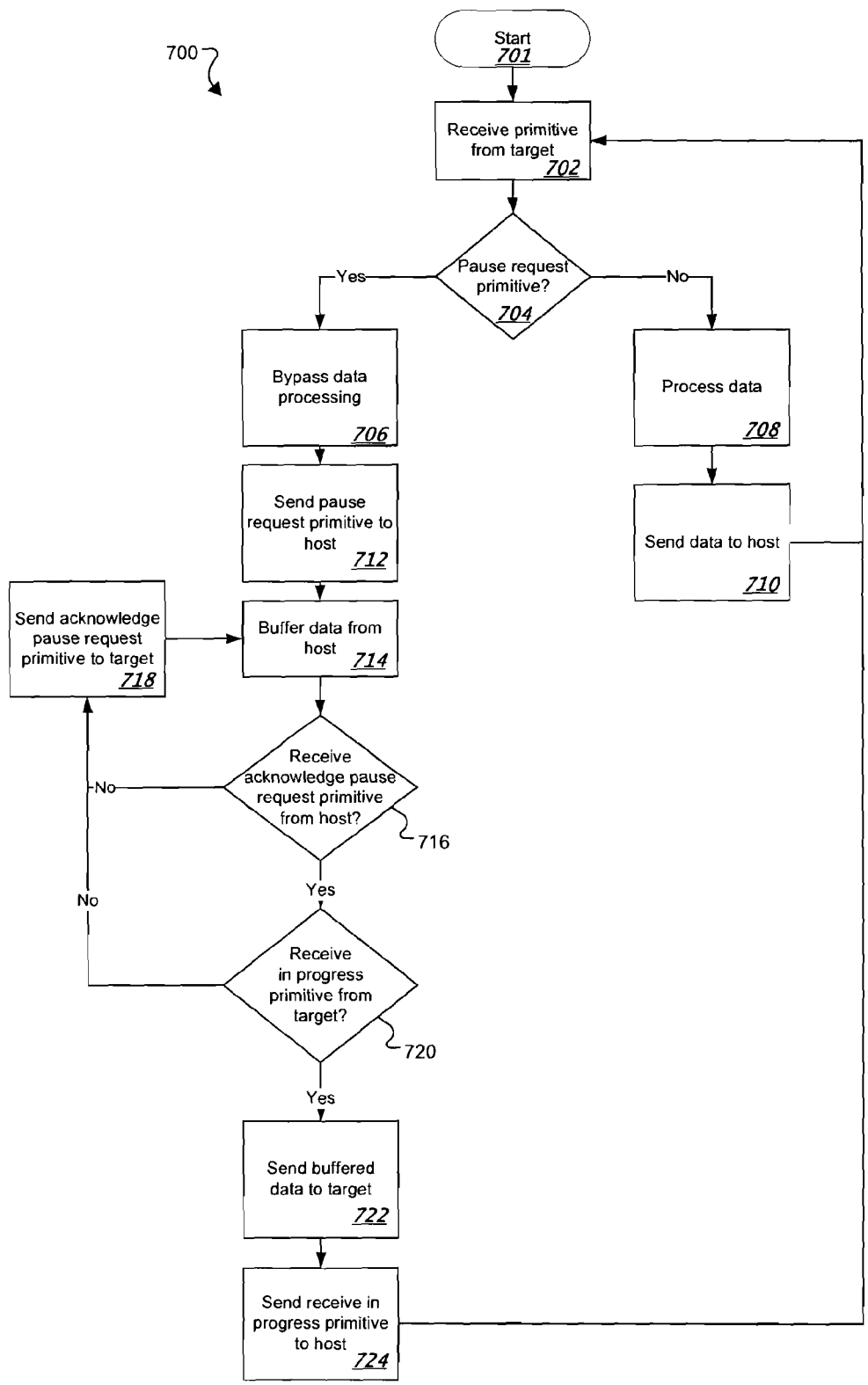
FIG. 7 is a block diagram depicting an exemplary method for processing a pause request from a SATA target coupled to a data traffic modification device.

FIG. 7 illustrates an exemplary block diagram depicting a process 700 for handling a pause request from a SATA target in a data traffic modification device, for example, the process illustrated by FIG. 5. The process begins at step 701, which could be entered automatically upon power-up, in response to a software request, in response to an electrical signal, or other methods for initiating a software process in a data traffic modification device or combinations thereof. At step 702, a primitive is received from a target. If, at step 704, the primitive received at step 702 is not a pause request, then control passes to step 708.

At step 708 data is processed. For example, this may mean that the data received from the target may be processed or otherwise modified in a manner, for example, such as that described by blocks 212-214, 220-228, and 236 of FIG. 2. At step 710, processed data is sent to a host. Control then passes back to step 702, to receive additional primitives from the target.

If, at step 704, the primitive received at step 702 is a pause request primitive, then the process continues at step 706. At step 706, the pause request primitive is allowed to bypass data processing steps. At step 712 the unprocessed pause request primitive is sent to the host. At step 714, the data traffic modification device begins to buffer data received from the host in a FIFO.

If, at step 716, a acknowledge pause request primitive is received from the host, then control passes to step 720. If, at step 716, an acknowledge pause request primitive is not received from the host, then control passes to step 718. During step 718, the acknowledge pause request primitive is sent to the target.

If, at step 720, the data traffic modification device does not receive a read in progress primitive from the target device, then control passes to step 718. If at step 720 a read in progress primitive is received from the target, then the process continues at step 722. During step 722, data buffered in the FIFO (if any) during step 714 is sent to the target. At step 724, a read in progress primitive is sent to the host. In some embodiments, this may signal the host that the target or the data traffic modification device is ready to accept data.

FIG. 8 is a block diagram of an exemplary process 800 for re-establishing a context in a data traffic modification device. The process begins at step 802, which could be entered automatically upon power-up, in response to a software request, in response to an electrical signal, or other methods for initiating a software process in a data traffic modification device or combinations thereof. At step 804 a primitive is received from a target. If, at step 806, the primitive is determined to be a continue request primitive, then control passes to step 808. At step 808, the data traffic modification device saves the context of the continue request primitive. For example, the continue request primitive may be part of a continued read in progress primitive combination of messages. In this case, the data traffic modification device would save information that would allow the data traffic modification device to recall the continued read in progress primitive state. After this information is saved, control passes to step 810.

If, at step 806, the primitive received from the target is not a continue request primitive, then control passes to step 810. At step 810, the data traffic modification device begins to buffer data from the target in a FIFO. At step 812, the data traffic modification device may process of otherwise modify data from the host in a manner possibly such as that described by blocks 212-214, 220-228, and 236 of FIG. 2. At step 814, the processed data is sent to the host.

At step 816, data is received from the host. If, at step 818, the incoming data is a continued pause request primitive sequence, then control passes to step 820. At step 820, the continued pause request primitive sequence is sent to the target. At step 822 the data traffic modification device sets a holding state. In some embodiments, this may involve saving data, setting a register bit, or other types of computer memory, so the data traffic modification device can recall that the device is in this state. Control then passes to step 824.

If, at step 818, the incoming data is not a continued pause request primitive sequence, then control passes to step 824. If, at step 824, the data traffic modification device is not in a holding state, then the process continues at step 826, otherwise the process continues at step 828. At step 826, the data traffic modification device sends a acknowledge pause request primitive to the initiator. The process then continues at step 832, where any data that may have been buffered from the target is sent to the host.

At step 828, the data traffic modification device recalls the state that was saved during step 808 and uses that state information to re-establish the continued state at step 830. For example, if the saved state was a continued read in progress primitive state, the data traffic modification device may send a continued read in progress primitive sequence to the host. Control then passes to step 832 where any data that may have been buffered from the target is sent to the host. The process then returns to step 804 to receive additional primitives from the target.

FIGS. 9*a-c* illustrate a stream of data, and two exemplary data substitution processes being performed upon the data stream. FIG. 9*a* depicts a series of ten dwords in a section of a data buffer 900, where each dword is numbered 0-9. In these examples, the dword 0 arrived in the buffer first, and each of the dwords arrived in sequence until dword 9 which arrived last. In FIG. 9*a*, the data traffic modification device has been triggered to sample data from dword 4. This trigger may be invoked by a predefined data pattern, an offset from the start of a data frame, after a timed offset, an external trigger stimulus, or any other method that may be used to trigger a data traffic modification device or combinations thereof. In this example, the data traffic modification device has been configured to sample the entire dword in cell 4, but in other embodiments the data traffic modification device may be configured to sample any number of bits within a data frame.

FIG. 9b illustrates an example of a substitution process. In this example, the data traffic modification device has taken the data sampled from frame 4 and has used it to replace the data that was originally in frame 7. In some embodiments, the data traffic modification device may perform this substitution upon any frame that may be encountered after the substitution data has been sampled. In some embodiments, a single trigger may invoke the sampling and substitution processes. In some embodiments, the sampling process and substitution process may be invoked by independent triggers. In some embodiments, one or more of the bits of sampled data may be used in the substitution process. In some embodiments, the sampled data may be modified by incrementing, decrementing, bit shifting, bit masking, by performing bitwise operations with the sampled and target data, or by other methods for modifying a collection of bits, in a data traffic modification device or by combinations thereof.

FIG. 9c illustrates an example of a substitution process that may be performed on buffered data. In this example, the data traffic modification device has taken the data sampled from dword 4 and has used it to replace the data originally found in dword 1. Although dword I arrived in the buffer 900 prior to dword 4, the data traffic modification device may still perform a substitution process upon dword I or any other dword that is held in the buffer 900.

After a substitution process, such as those illustrated by FIGS. 9a-9c, the data frame may no longer contain valid CRC data. The data traffic modification device may calculate valid CRC data based upon the contents of the frame, and replace the original CRC data with the valid, calculated CRC data.

Figure 10A:
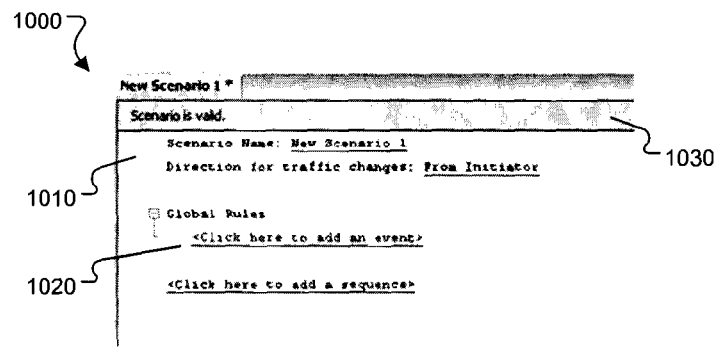
FIGS. 10a-d illustrate an exemplary graphical user interface for viewing and editing data modification scenarios.

FIGS. 10a-d illustrate an exemplary editor graphical user interface (GUI) 1000 for viewing and editing data modification scenarios. The editor GUI 1000 may be implemented as a software program running on a computer. In FIG. 10a the editor GUI 1000 includes an adaptive text interface 1010, a scenario description 1020, and a status indicator 1030. In some embodiments the adaptive text interface 1010 may be capable of guiding the user through the scenario development process by displaying the scenario description as a collection of English (or other written language) phrases. In some embodiments, the adaptive text interface 1010 may provide a collection of editable fields or regions that the user may activate to full in information that defines a scenario. In some embodiments when the user invokes an editable region, the adaptive text interface 1010 may respond by presenting dialog boxes, wizards, entry blanks, dropdown list boxes, or other user input controls by which a user may enter data into a computer application. In the depicted example, the user has opened a new scenario template but has not yet entered any information into it.

A scenario that configures a data traffic modification device to do nothing may be considered to be a valid configuration. In some embodiments, the editor GUI 1000 may check the validity of scenarios in real-time as the user edits the configuration. In some embodiments, the editor GUI 1000 may check the validity of scenarios upon the request of the user, while saving a local copy of the scenario, while deploying a scenario to a data traffic modification device, or the like.

Status indicator 1030 appears as a banner that is capable of displaying an indication of the validity status of the scenario. In some embodiments, this indication may be made using text, a graphical indication, animation, color coding, or other indications that may be used to convey a status or combinations thereof. In this example, the status indicator 1030 displays an indication of the validity status of the scenario description 1020.

Figure 10B:
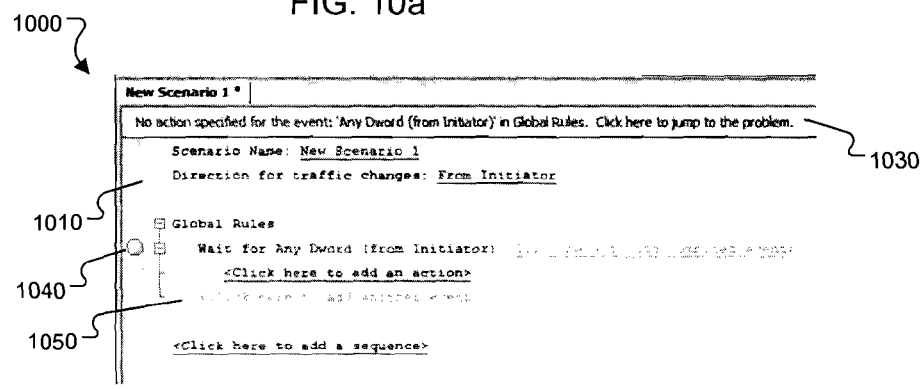

FIG. 10b illustrates the editor GUI 1000 and an exemplary adaptive text interface 1010, including an incomplete scenario description 1050. In this example, the user has added an event definition to the incomplete scenario description 1050, but the user has not added a corresponding action definition. The editor GUI 1000 determines that the incomplete scenario definition 1050 is not a valid configuration for a data traffic modification device, and the status indicator 1030 is updated to reflect this validity status. In some embodiments, the status indicator may provide an interactive functionality that allows the user to jump to the source of the invalid state within the incomplete scenario definition 1050. The editor GUI 1000 also includes an error location indicator 1040, which may be used to point out the location of an error within the incomplete scenario description 1050. In some embodiments, the error location indicator 1040 may appear as a graphical indicator, an animation, a color code, a text highlight, a font alteration, or a combination of these or other methods by which an erroneous line of a description may be indicated.

Figure 10C:
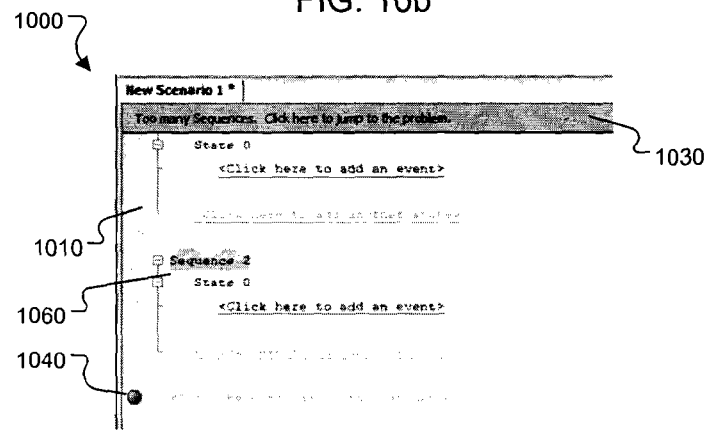

FIG. 10c illustrates an exemplary erroneous scenario definition 1060. In this example, the user has added three sequences to the erroneous scenario definition 1060. In this example, the user has edited more than the allowed maximum of two sequences. The editor GUI 1000 does not restrict the user from entering any invalid number of sequences to the erroneous scenario definition 1060. The editor GUI 1000 displays indicator based on a determination that the erroneous scenario definition 106C is invalid. The status indicator 1030 and error location indicator 1040 provide the user with a graphical indication of the erroneous status of the erroneous scenario definition 1060.

Figure 10D:
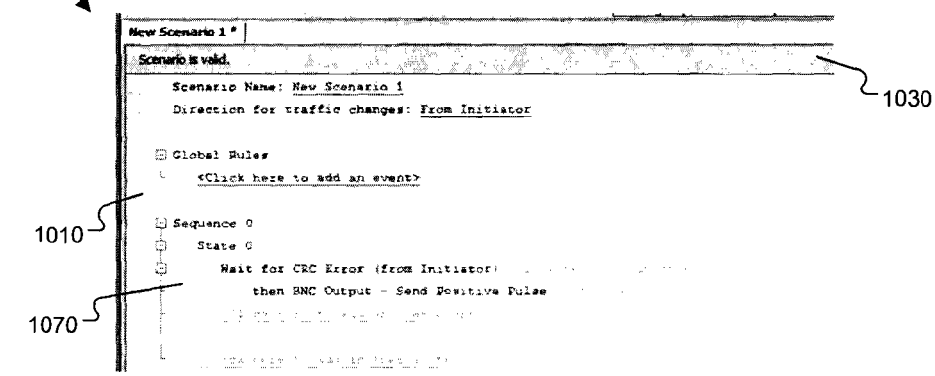

FIG. 10d depicts an exemplary valid scenario definition 1070. The editor GUI 1000 determines the valid state of the valid scenario definition 1070 as each edit is made, and status indicator 1030 is updated to reflect the valid status. Examples of editing scenario definitions are described in further detail in U.S. provisional patent application 60/779,084 entitled, "Scenario View Method and Apparatus," by Lee, D., et al., which was filed Mar. 3, 2006, and the contents of which are incorporated herein by reference.

In some embodiments the editor GUI 1000 may be capable of saving a scenario description as binary data locally, and/or to a data traffic modification device. In some embodiments, the editor GUI 1000 may be capable of saving the scenario definition in a human readable format (e.g., text, XML, CSV, HTML, tagged, and the like) either locally or to a data traffic modification device. In some embodiments, the editor GUI 1000 may be capable of retrieving scenario definitions from a data traffic modification device. In some embodiments, the editor GUI 1000 may be capable of synchronizing saved versions of scenario definitions between the computer running the editor GUI 1000 and the data traffic modification device. For example, a computer running the editor GUI 1000 may hold a version of a scenario that is at a different revision level than a scenario that is stored in a data traffic modification device. In some embodiments the editor GUI 1000 may provide the user with a method to synchronize the editor GUI 1000 and data traffic modification device to cause identical versions of a scenario to exist in both locations. In some embodiments, the editor GUI 1000 may merge or otherwise reconcile the differences between two or more scenarios. In some embodiments, the editor GUI 1000 may be capable of querying the data modification device to determine the revision level of a scenario that may be saved on the data modification device. In some embodiments, the editor GUI 1000 may record information relating to one or more scenarios (e.g., scenario name, revision level, creation data, last modified date) on one or more data traffic modification devices. In some embodiments, scenario data may be saved in a manner that may allow the data to be correlated to manufacturing data (e.g., lot codes, serial numbers, and dates of manufacture). For example, a database may be queried in order to determine which version of a scenario was used to test a particular batch of manufactured disk drives. In some embodiments, scenario definitions may be deployed to a data traffic modification device through the use of a portable storage device. For example, a scenario definition may be saved to a floppy disk or a USB drive. When the user inserts the disk or drive into a data traffic modification device, the data traffic modification device may then provide a method for copying the scenario definitions on the disk or drive to the data traffic modification device.

In some embodiments, the data traffic modification device and the computer running the editor GUI 1000 may communicate through a common Ethernet network, and this communications link may allow the editor GUI 000 to save and/or retrieve scenario data to or from the data traffic modification device. In some embodiments, the data traffic modification device and the computer running the editor GUI 1000 may communicate through a universal serial bus (USB), IEEE488, IEEE1384, RS-232, RS-422, RS-488, or any other such serial or parallel communications bus or combinations thereof. In some embodiments, the editor GUI 1000 may save the binary or human readable scenario data in a compressed format. In some embodiments, the data traffic modification device may be used as a stand-alone instrument. For example, once a scenario definition has been saved to the data traffic modification device, the data traffic modification device may be disconnected from the computer running the editor GUI 1000. Examples of using scenario definitions in a stand-alone data traffic modification device are described in further detail in U.S. provisional patent application 60/779,179 entitled, "Protocol Traffic Modification Method and Apparatus," by Fouxman, E., et al., which was filed Mar. 3, 2006, and the contents of which are incorporated herein by reference.

Although various embodiments have been described, further embodiments are possible. For example, some embodiments may be implemented with a stand-alone data traffic modification system, a waveform processing system, a digital storage oscilloscope, a protocol analyzer, or logic analyzer. Some implementations may include two or more channels to acquire multiple signals substantially simultaneously. Examples of various features and operational aspects of some implementations for performing traffic modification are described in further detail in U.S. provisional patent application Ser. No. 60/892,093 entitled, "Data Traffic Modifier Method and Apparatus" by Roy, A., et al., which was filed Feb. 28, 2007, and the contents of which are incorporated herein by reference.

Although some examples describe apparatus and methods with reference to data traffic modifiers, some features may apply to other implementations. For example, in one other embodiment, a variant of the described graphical user interface may be adapted for editing code for a protocol analyzer, oscilloscope triggering mechanism, logic analyzer, and/or other waveform processing systems.

In some embodiments, the data traffic modification device may receive updates, or be monitored and/or controlled from another (e.g., remote) computer with which the data traffic modification device can communicate over a communications link. Such a communications link may include a software control layer (SCL) running on the computer currently controlling the data traffic modification device. In some embodiments, the SCL may detect a failure to receive a complete version of expected data. The SCL may notify interested software layers that the request failed. Before sending a new request for the desired data to be transmitted, the SCL, based on the knowledge of previously failed receive attempts, may check whether it can read at least 1 byte of data. If there is no data in the receiving buffers, then the communication flow is considered restored, and the request to the data traffic modification device to transmit the desired data is sent.

If upon checking the buffers it is determined that the SCL can read at least one byte from the receiving buffers, the SCL will try to receive, read and discard any data that the device might be sending that is left over from the disconnected communication. When SCL determines that there is no longer any data in the receiving queue to read during some specified timeout (reached the state of "line silence") the communication flow is considered restored and the new request is sent to the data traffic modification device to transmit the desired data.

In some implementations, the physical connection may once again be lost during this process of "cleaning" the receiving queue before sending the new request. In such a case, even if the SCL considers the communication line to be clear, some data will remain in the device sending queue and will be sent to the SCL after the physical connection is recovered. In order to confirm proper operation, the SCL may check whether a new data response from the device has the same attributes as the request sent to the device from the SCL. If not, this received data is preferably discarded and the request may be reported as having failed. The communication flow recovery mechanism may remain active and it may try clear data from the receiving queue before sending a new request. Examples of restoring a software communications layer are described in further detail in U.S. provisional patent application 60/779,085 entitled, "Communication Flow Recovery Method and Apparatus," by Karpov, D., which was filed Mar. 3, 2006, and the contents of which are incorporated herein by reference.

In an illustrative example, the data traffic modification device may be used in a laboratory environment. For example, a user may edit a scenario with an editor GUI running on a first computer (e.g., the editor GUI 1000 of FIG. 10). The GUI may provide an adaptive text interface to assist the user while editing the scenario. The editor GUI may also display a visible indication of the validity of the scenario substantially in real-time as the user enters each edit into the editor GUI 1000. The scenario may be defined for use on a data traffic modification device. The user may disconnect the communications link to the data traffic modification device to operate the data traffic modification device as a stand-alone instrument. In some examples, the user may connect the data traffic modification device between a SATA host and a SATA target. In some embodiments, a trigger output of a data traffic modification device may also be connected to a trigger input of a protocol analyzer. Although a protocol analyzer is described in this example, the trigger output of the data traffic modification device may be connected to a variety of external devices which include, but are not limited to, oscilloscopes, power supplies, digital multi-meters, spectrum analyzers, waveform processing devices, automation systems, and the like. In some examples, the user may configure the data traffic modification device to send a trigger output whenever it detects a continued pause request being sent across the SATA link. When the data traffic modification device detects this condition, it may respond by performing several actions. The data traffic modification device may stimulate the trigger output as defined by the user in the editor GUI. The data traffic modification device may save a context of the communications link prior to the arrival of the continued pause request, and buffer any data sent from the host or target prior to the host or target sending a hold acknowledgement message. The trigger output may cause the protocol analyzer to log all the data primitives that pass through the SATA link after the data traffic modification device detects the continued pause request. If the data traffic modification device receives a pause cancellation message, the data traffic modification device may respond by sending any buffered data and reestablishing the context of the SATA link prior to resuming the data transfer. The use may also edit the scenario with the editor GUI running on a second computer (e.g., the editor GUI 1000 of FIG. 10) to load the scenario from the data traffic modification device to view or edit the scenario on the second computer.

In another illustrative example, a data traffic modification device may be used in, a manufacturing test environment. For example, a data traffic modification device may be connected in a SATA link between a test computer acting as a SATA host and a SATA disk drive in a disk drive testing system. A trigger input of the data traffic modification device may be connected to a programmable logic controller (PLC) that is controlling automated aspects of the manufacturing test process. The data traffic modification device may also connect to a development computer running an editor GUI (e.g., the editor GUI 1000) across an Ethernet network to allow a test engineer to remotely develop and/or to deploy scenarios to the data traffic modification device. In some implementations, the test engineer may use the editor GUI to connect to one or more data modification devices and perform a synchronization process to distribute a common, synchronized version of a scenario definition to the manufacturing test environment. The test engineer may use the editor GUI to read and record information about the scenarios that have been deployed to the data traffic modification device, and that data may be relayed to a database that may be queried to determine which version of the scenario was used to test a disk drive associated with a particular serial number or lot code. A supervisory computer may use a software control layer (SCL) to connect to one or more data traffic modification devices in the manufacturing test environment. The PLC may connect the disk drive to the data traffic modification device, trigger the host computer to write data to the disk drive, and send a trigger to the data traffic modification device during the testing process. The supervisory computer may monitor the activity of the data traffic modification device and provide a link between the data traffic modification device and a manufacturing resource planning (MRP) system. If the communications link between the supervisory computer and data traffic modification device is interrupted, the SCL may attempt to recover the communications link in order to allow the MRP system to continue monitoring the data traffic modification device.

Various embodiments may include aspects of a computer. The essential elements of a computer are a processor for executing instructions and one or more memories for storing instructions and data. Suitable processors for the execution of a program of instructions include, by way of example, both general and special purpose microprocessors, which may include a single processor, or multiple processors in combination. The processor and the memory can be supplemented by, or incorporated in, ASICs (application-specific integrated circuits). Generally, a processor will receive instructions and data from a data store, such as a read-only memory (ROM), a random access memory (RAM), or both.

Generally, a computer will also include, or be operatively coupled to communicate with, one or more mass storage devices for storing data files. Storage devices suitable for tangibly embodying computer program instructions and data may include volatile and/or non-volatile memory (NVM), which may include, but is not limited to, semiconductor memory devices (e.g., RAM, EPROM, EEPROM, NAND flash, NOR flash, thumb drives), magnetic disks (e.g., hard disc drives), magneto-optical and/or optical media (e.g., CD, DVD).

In some implementations, one or more user-interface features may be custom configured to perform specific functions. Various embodiments may be implemented in a computer system that includes a graphical user interface and/or an Internet browser. To provide for interaction with a user, some implementations may be implemented on a computer having a display device, such as a CRT (cathode ray tube) or LCD (liquid crystal display) monitor for displaying information to the user, a keyboard, and a pointing device, such as a mouse, stylus, or a trackball by which the user can provide input to the computer.

In various embodiments, systems such as the data traffic modification device 105 may communicate using suitable communication methods, equipment, and techniques. For example, the data traffic modification device 105 may communicate with a portable computer, network server, or other device using point-to-point communication in which a message is transported directly from the source to the receiver over a dedicated physical link (e.g., fiber optic link, point-to-point wiring, and daisy-chain). Other embodiments may transport messages by broadcasting to all or substantially all devices that are coupled together by a communication network, for example, by using omni-directional radio frequency (RF) signals, while still other embodiments may transport messages characterized by high directivity, such as RF signals transmitted using directional (i.e., narrow beam) antennas or infrared signals that may optionally be used with focusing optics. Still other embodiments are possible using appropriate interfaces and protocols such as, by way of example and not intended to be limiting, RS-232, RS-422, RS-485, 802.11a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

In some embodiments, each memory may be programmed with the same information and be initialized with substantially identical information stored in non-volatile memory. In other embodiments, one or more devices may be custom configured to perform specific functions.

A number of implementations have been described. Nevertheless, it will be understood that various modifications may be made without departing from the spirit and scope. For example, advantageous results may be achieved if the steps of the disclosed techniques were performed in a different sequence, if components in the disclosed systems were combined in a different manner, or if the components were replaced or supplemented by other components. The functions and processes (including algorithms) may be performed in hardware, software, or a combination thereof, and some implementations may be performed on modules or hardware not identical to those described. Accordingly, other implementations are within the scope of the following claims.

What is claimed is:

1. A method of processing a waveform that comprises signals compliant with a version of a Serial Advanced Technology Attachment (SATA) protocol, the method comprising:
    receiving and sampling a bi-directional data stream from a source device over a first SATA-compliant data link;
    selectively modifying the received data stream by monitoring the data stream and modifying at least one bit in the data stream in response to detecting a trigger condition, wherein at least one bit to be modified is received in a buffer before receiving data that fulfills the trigger condition;
    sending the selectively modified data stream to a target device over a second SATA-compliant data link;
    receiving a SATA-compliant hold request signal comprising a SATA HOLD primitive from the target device;
    generating a SATA-compliant hold acknowledge signal comprising a SATA HOLDA primitive to send to the target device in response to the received hold request signal;
    sending the received hold request signal to the source device;
    buffering the data stream after receiving the hold request signal and at least until the source device interrupts the data stream in response to the hold request signal;
    receiving a resume signal from the target device to resume transmission of the data stream; and
    sending the buffered data to the target device in response to receiving the resume signal.

2. The method of claim 1, further comprising restoring a context of the data stream in response to receiving the resume signal and before resuming transmission of the data stream.

3. The method of claim 1, wherein the trigger condition comprises a user-specified data value in the data stream.

4. The method of claim 1, further comprising sending the hold acknowledge signal to the target device within up to 20 double words after receiving the hold request signal.

5. The method of claim 1, further comprising monitoring signals from the target device to detect the hold request signal.

6. The method of claim 1, wherein sending the received hold request signal to the source device comprises propagating the received hold request signal through the buffer.

7. The method of claim 6, wherein the buffer comprises a first-in, first-out buffer.

8. The method of claim 1, wherein the signal from the target device to resume transmission of the data stream comprises a SATA-compliant primitive to cancel a SATA-compliant continuation primitive in effect.

9. The method of claim 1, wherein the target device comprises a data storage device.

10. The method of claim 9, wherein the data storage device comprises a rotating data storage medium.

11. The method of claim 1, further comprising sampling the data stream with a protocol analyzer.

12. The method of claim 1, wherein the step of selectively modifying the data stream comprises selectively modifying data in data traffic in more than one direction.

13. A method of processing a waveform that comprises signals compliant with a version of a Serial Advanced Technology Attachment (SATA) protocol, the method comprising:
    receiving and sampling a bi-directional data stream at an input module of a data traffic modification device, the data traffic modification device being configured to buffer the received data stream in a buffer module, to selectively modify data in the received data stream in response to a trigger signal indicating the occurrence of a predefined condition, wherein at least one bit to be modified is received in the buffer before receiving data that causes the signal indicating the occurrence of the predefined condition, and to transmit the selectively modified data stream from an output module, wherein the input module is connectable to a source device and the output module is connectable to a target device;
    monitoring data in the received data stream;
    detecting in the monitored data a SATA-compliant signal comprising a HOLD primitive to request a pause in the data stream;
    generating a SATA-compliant signal comprising a HOLDA primitive to acknowledge the pause request signal;
    pausing the transmission of the selectively modified data stream in response to the pause request signal;
    identifying a state instruction most recently received by the data traffic modification device before receiving the pause request signal;
    storing the identified state instruction; and
    before resuming transmission of the data stream, sending the stored state instruction to the source device to reestablish the stored state of the data stream.

14. The method of claim 13, wherein the step of sending the stored state instruction to the source device comprises consecutively sending the stored state instruction at least twice to reestablish the stored state.

15. The method of claim 13, wherein the version of the SATA protocol is compatible with SATA 2.0.

16. The method of claim 13, wherein the data stream comprises signals compliant with a version of a serial attached SCSI (small computer serial interface) protocol.

17. The method of claim 13, wherein the target device comprises one or more electronic data storage devices.

18. The method of claim 13, wherein the input module is connectable to a source device through a data bus expander device.

19. The method of claim 13, wherein the output module is connectable to a target device through a data bus expander device.

20. The method of claim 13 further comprises sending a pause acknowledgement signal to the source device within a predefined response specification after receiving the pause request signal.

21. The method of claim 20, wherein the predefined response specification corresponds to receiving up to a threshold quantity of data in the data stream after receiving the pause request signal.

22. The method of claim 13, wherein the threshold quantity of data is 20 double words.

23. A method comprising:
    selectively modifying data traffic being conveyed in a bidirectional data transfer between a source device and a target device by monitoring and sampling the data traffic and modifying at least one bit in the data traffic in response to a detected trigger condition, at least one bit to be modified is received in a buffer before receiving data that fulfills the trigger condition, the data traffic in the data transfer comprising state information for the target device;
    storing the state information during the data transfer;
    receiving a Serial Advanced Technology Attachment (SATA) compliant HOLD primitive hold request from the source device to pause the data transfer;

generating a SATA compliant HOLDA primitive hold acknowledgement in response to the received host request;

pausing the data transfer in response to the hold request;

receiving a signal from the source device to resume the data transfer;

generating signals to send to the source device, the generated signals corresponding to the stored state information in effect at the time of pausing the data transfer; and, resuming the data transfer after sending the generated signals.

24. The method of claim 23, wherein the generated signals comprise at least two sequential SATA-compliant primitive values corresponding to the stored state information.

25. The method of claim 23, wherein receiving the request from the source device to pause the data transfer comprises monitoring the data traffic.

26. The method of claim 25, wherein receiving the request from the source device to pause the data transfer further comprises detecting in the monitored data a SATA-compliant signal to request a pause in the data stream.

27. The method of claim 23, wherein selectively modifying the data traffic comprises introducing a data error.

28. The method of claim 27, wherein selectively modifying the data traffic further comprises updating an error detection value in the data traffic such that the updated error detection value corresponds to the selectively modified data with the introduced data error.

* * * * *